United States Patent
Lin et al.

(10) Patent No.: US 7,701,166 B2
(45) Date of Patent: Apr. 20, 2010

(54) MULTIPLE INPUT/OUTPUT POWER SUPPLY DEVICE AND OPERATING METHOD THEREOF

(75) Inventors: Fang-Chuan Lin, Taipei (TW); Kuan-Wei Lee, Taipei (TW); Shih-Hua Chang, Taipei (TW); Jui-Ming Chang, Taipei (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 393 days.

(21) Appl. No.: 11/797,917

(22) Filed: May 9, 2007

(65) Prior Publication Data

US 2008/0278110 A1 Nov. 13, 2008

(51) Int. Cl.
*H01M 10/46* (2006.01)
(52) U.S. Cl. ...................................... 320/101
(58) Field of Classification Search ............ 320/101, 320/111, 114, 115, 132; 323/906; 136/244, 136/291, 293
See application file for complete search history.

(56) References Cited

U.S. PATENT DOCUMENTS

| | | | | |
|---|---|---|---|---|
| 6,081,104 A | * | 6/2000 | Kern | 323/268 |
| 6,326,764 B1 | * | 12/2001 | Virtudes | 320/101 |
| 2006/0185727 A1 | * | 8/2006 | Matan | 136/293 |

* cited by examiner

*Primary Examiner*—Edward Tso
(74) *Attorney, Agent, or Firm*—Rosenberg, Klein & Lee

(57) ABSTRACT

A multi-functional power supply device comprises: a secondary cell, a charging circuit, a controller, and a first connection unit. The secondary cell is used to store electrical energy, and produces a first voltage and a second voltage. When the first connection unit is electrically connected to a solar board, the charging circuit receives the electrical energy which is transformed from the solar board and is then stored in the secondary cell. The controller controls the second voltage to produce at least one output voltage to an application apparatus. Moreover, when the first connection unit changes to connect with a lighting device, the secondary cell provides the first voltage to the lighting device directly. Hence, the present invention provides power to the application apparatus, and produces a light source through the lighting device at the same time.

15 Claims, 5 Drawing Sheets

MULTIPLE INPUT/OUTPUT POWER SUPPLY DEVICE AND OPERATING METHOD THEREOF

BACKGROUND OF THE INVENTION

1. Field of the Invention

The present invention relates to a power supply device, and more particularly to a multi-functional power supply device and its operating method that charges power via solar energy.

2. Description of Related Art

As industries and technologies advance rapidly, our living environment and habits have been changed. The issue of energy has become an important subject in recent years. To meet the increasingly high global demand for energy, more and more energy related industries are developing. Furthermore, people are also paying more attention to environmental and ecological protection and the quality of our living environment. Thus it is necessary to take into consideration minimizing the use of chemicals and prevent damage being caused to the environment as we develop energy sources. Therefore, solar energy has become increasingly looked to as a major energy source that is capable of supplying sufficient quantities of energy without inflicting further damage to the world's ecology.

As to conventional solar charging systems, most solar charging systems are provided for charging specific products, thus it is difficult to make solar charging become more efficient and effective. When a product is charged, the existing designs of products cannot be used for achieving applications with different functions. Although users can charge sufficient electric energy to a secondary cell of the product via solar energy, the electric energy is supplied for the use of an external system through a limited number of connection ports provided by the product, thus the flexibility and function of the whole solar charging system are restricted.

Therefore, finding a way of providing sufficient battery storage while fitting an operating place and providing different applications has been an increasingly researched subject for designers and manufacturers of solar energy related industries.

SUMMARY OF THE INVENTION

In view of the foregoing shortcomings, the present invention provides a power supply device to be connected to a solar board for charging a secondary cell during daytime or under sunlight. The power supply device can also be connected to a lighting device for producing illumination in the same way as can be achieved by connecting connection units, thereby maximizing energy sources. Regardless of whether it is daytime or nighttime, the power supply device can be connected to an application apparatus for supplying electric energy to the application apparatus.

To achieve the foregoing objective, the present invention provides a multi-functional power supply device comprising: a secondary cell, a charging circuit, a controller, and a first connection unit. The secondary cell stores electric energy and produces a first voltage and a second voltage. When the first connection unit is electrically connected to a solar board, the charging circuit receives electric energy which is transformed from the solar board and charges the secondary cell. Alternatively, when the first connection unit is connected to a lighting device, the first connection unit provides a first voltage generated by the secondary cell to the lighting device, while the controller is electrically connected to the secondary cell for controlling the second voltage and outputting at least one output voltage to an application apparatus. Therefore, the first voltage and the second voltage produced by the secondary cell can be used for producing a light source and providing a power supply.

To achieve the foregoing objective, the present invention also provides an operating method for a multi-functional power supply device. The method comprises the steps of: connecting a first connection unit to a solar board; providing a secondary cell for storing electric energy transformed and outputted by the solar board and producing a first voltage and a second voltage; determining whether or not the first connection unit is connected to a lighting device, and, if the first connection unit is connected to the lighting device, the first connection unit will then provide the first voltage to the lighting device to produce a light source, and the multi-functional power supply device will provide a power output unit to connect an application apparatus, so that the second voltage produced by the secondary cell constitutes a power supply for the use of the application apparatus.

To make it easier for our examiner to understand the innovative features and technical content, we use preferred embodiments together with the attached drawings for the detailed description of the invention, however it should be noted that the attached drawings are provided for reference and description, and not for limiting the present invention.

DETAILED DESCRIPTION OF THE PREFERRED EMBODIMENTS

Figure 1:
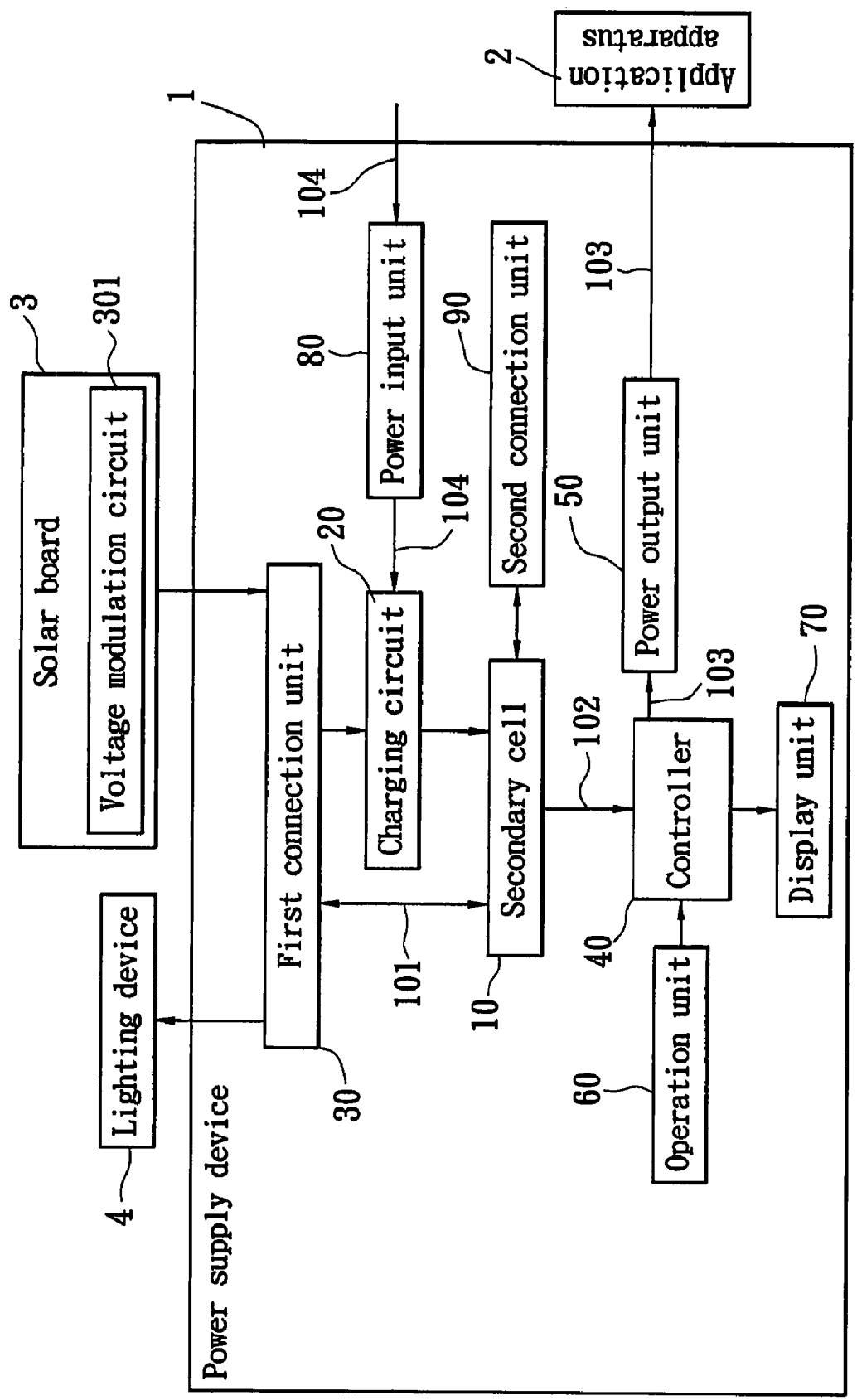
FIG. 1 is a block diagram of a combination power supply of the present invention.

Referring to FIG. 1, which is a block diagram of a multi-functional power supply device in accordance with a preferred embodiment of the present invention, the invention provides a power supply device 1 that allows users to decide whether or not to charge a secondary cell via solar energy, so that users can choose to connect a solar board 3 or a lighting device 4. The power supply device 1 comprises: a secondary cell 10, a charging circuit 20, a first connection unit 30, a controller 40, at least one power output unit 50, an operation unit 60, and a display unit 70. If the power supply device 1 is under sunlight, and a user wishes to charge a secondary cell via solar energy, then the user can connect the solar board 3 to the first connection unit 30, and the first connection unit 30 can be used for transmitting electric energy which is transformed and outputted by the solar board 3 to a charging circuit 20 that is electrically connected between the first connection unit 30 and the secondary cell 10 for charging the secondary cell 10. If the secondary cell 10 is in storing electric energy mode, a first voltage 101 and a second voltage 102 will be produced.

The secondary cell 10 can be a lead-acid battery (Sealed Rechargeable Battery). The solar board 3 further comprises a voltage modulation circuit 301 for boosting and regulating the voltage of the electric energy transformed by the solar board 3 to produce a constant voltage, and providing a constant voltage to the charging circuit 20 through the first connection unit 30 for charging the secondary cell 10. In the invention, the constant voltage is a constant voltage of 5 volts.

The controller 40 is electrically connected to secondary cell 10 for controlling the second voltage 102 to transform and output at least one output voltage 103 which is provided to an application apparatus 2 through the power output unit 50. The power output unit 50 can be a USB port or a power supply port electrically connected to the controller 40. The power output unit 50 is provided for users to connect an appropriate application apparatus 2 so that the application apparatus 2 can obtain the output voltage 103 provided by the power supply device 1. In addition, the operation unit 60 of the power supply device 1 is electrically connected to the controller 40 for providing an operating interface for users to operate or adjust the magnitude of an operating voltage of the connected application apparatus 2. In other words, the operation unit 60 depending on the second voltage 102 controlled by the controller 40 to change the magnitude of the output voltage 103 according to the requirements of the externally connected application apparatus 2. In this invention, the operating interface can be a push button or a knob.

The display unit 70 is electrically connected to the controller 40, and the controller 40 is provided for controlling and detecting a secondary cell 10 by a voltage detection circuit (not shown in the figure) to determine the voltage level of the secondary cell 10 and further show the power level and the charging condition of the secondary cell 10 on the display unit 70. The display unit 70 further displays the magnitude of output voltage 103 outputted and controlled by the controller 40, so that users can know about the magnitude of their adjusted outputted voltage. In practical applications, the display unit 70 can be a small-sized display device such as a liquid crystal display, (LCD) or a combination of different light emitting diodes (LED) to achieve a similar effect. Meanwhile, related information of the secondary cell 10 can be displayed similarly.

The description above assumes that the present invention takes place when the first connection unit 30 is connected to the solar board 3. If a user places the power supply device 1 under sunlight for charging a secondary cell via solar energy, the secondary cell 10 will be fully charged, so that the user can remove the solar board 3 from the first connection unit 30 at nighttime, and connect a lighting device 4 to the same first connection unit 30. Now, a first voltage 101 produced by the secondary cell 10 is provided directly to the lighting device 4 to produce a light source.

However, the power supply device 1 produces light by connecting the first connection unit 30 to the lighting device 4, while the power output unit 50 is provided for users to connect a required application apparatus 2. The operation unit 60 is provided for modulating the magnitude of the output voltage 103 and related information of the secondary cell 10 is displayed through the display unit 70. The power supply device 1 not only provides a light source produced by the lighting device 4, but also provides output voltages 103 of different magnitudes, thus the power supply device 1 can provide a light source and a power supply concurrently.

To prevent an incomplete charge of the secondary cell 10 by the power supply device 1 in an environment with insufficient sunlight or when the secondary cell 10 exhausts all its power during nighttime, the present invention further comprises a power input unit 80 electrically connected to a charging circuit 20, for receiving utility power 104 to charge the secondary cell 10 directly, so that the power supply device 1 not only continues charging and storing power to the secondary cell 10, but also provides a light source and a power supply concurrently.

It is noteworthy to point out that the present invention further comprises a second connection unit 90 corresponding to the design of the first connection unit 30, so that if a user owns several power supply devices 1, the second connection unit 90 of the original power supply device 1 of the invention can be connected to a first connection unit 30 of a second power supply device 1 to connect a plurality of secondary cells 10 in series or in parallel, such that users can have various combinations of the power supply devices 1.

Figure 2:
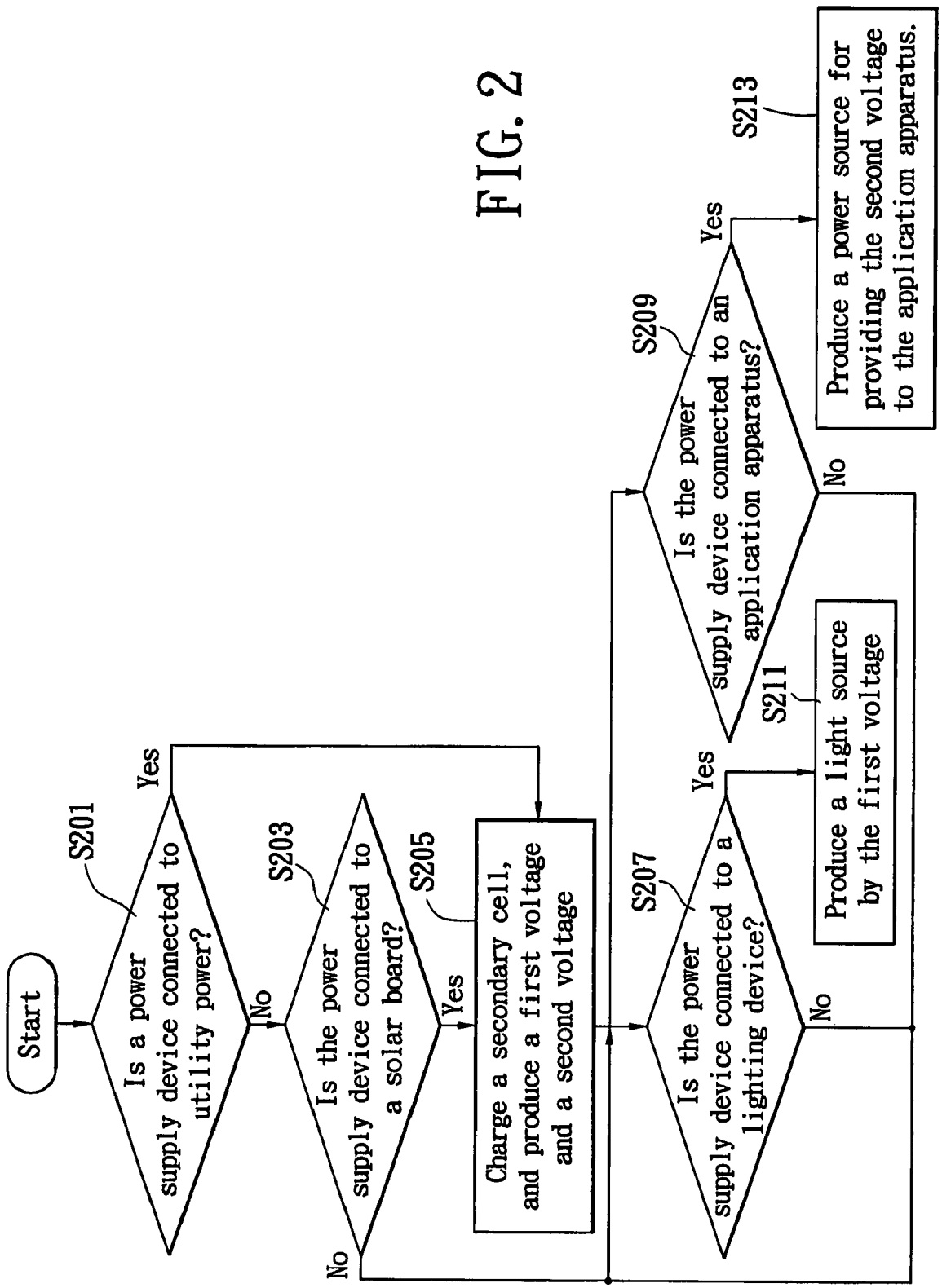
FIG. 2 is a flow chart for an operating method of a multi-functional power supply device of the present invention.

Please refer to FIG. 2 for an operating method of a multi-functional power supply device in accordance with a preferred embodiment of the present invention. The operating method of a power supply device 1 comprises the following steps: determining whether or not a power supply device 1 is connected to a utility power 104 (S201), if not, then determining whether or not the first connection unit 30 is connected to a solar board 3 (S 203) If the determination result of Step (S201) is affirmative, then the power supply device 1 will be connected to the utility power 104 through a power input unit 80. If the determination result of Step (S203) is affirmative, then the first connection unit 30 will be connected to the solar board 3 for charging a secondary cell 10, and producing a first voltage 101 and a second voltage 102 (S205).

After of step (S205) or the result of (S203) is determined to be negative, the procedure further determines whether or not the first connection unit 30 is connected to a lighting device 4 (S207), and also determines whether or not a power output unit 50 is connected to an application apparatus 2 (S209). If the result of Step (S207) is determined to be affirmative, then it indicates that the user has switched the connection of the first connection unit 30 to the lighting device 4, and thus the first voltage 101 of the secondary cell 10 is supplied to the lighting device 4, and the first voltage 101 produces a light source (S211). Alternatively, if the result of Step (S209) is determined to be affirmative, then it indicates that the user has also connected an application apparatus 2 at the same time, and thus the power source produced by the secondary cell 10 provides the second voltage 102 to the application apparatus 2 (S213). In addition, the power supply device 1 includes a controller 40 and an operation unit 60, so users can control the voltage according to the operating voltage of the using application apparatus 2 and output a second voltage 102 in compliance to an output voltage 103.

Alternatively, if a user still connects the first connection unit 30 to the solar board 3 for charging a secondary cell via solar energy in the determination process as described in Step (S207), and the result of Step (S207) is negative, then the steps (S207) and (S209) will be continued to determine the connecting status of the first connection unit 30 and the power output unit 50. In Step (S209), the determination is performed independently to decide whether or not the power supplied to the application apparatus 2 affects the determination result of Step (S207). In other words, the power output unit 50 is also connected to the application apparatus 2 for receiving the power supply of the secondary cell 10 for its operation, if the first connection unit 30 is connected to the solar board 3 for charging a secondary cell via solar energy.

Figure 3:
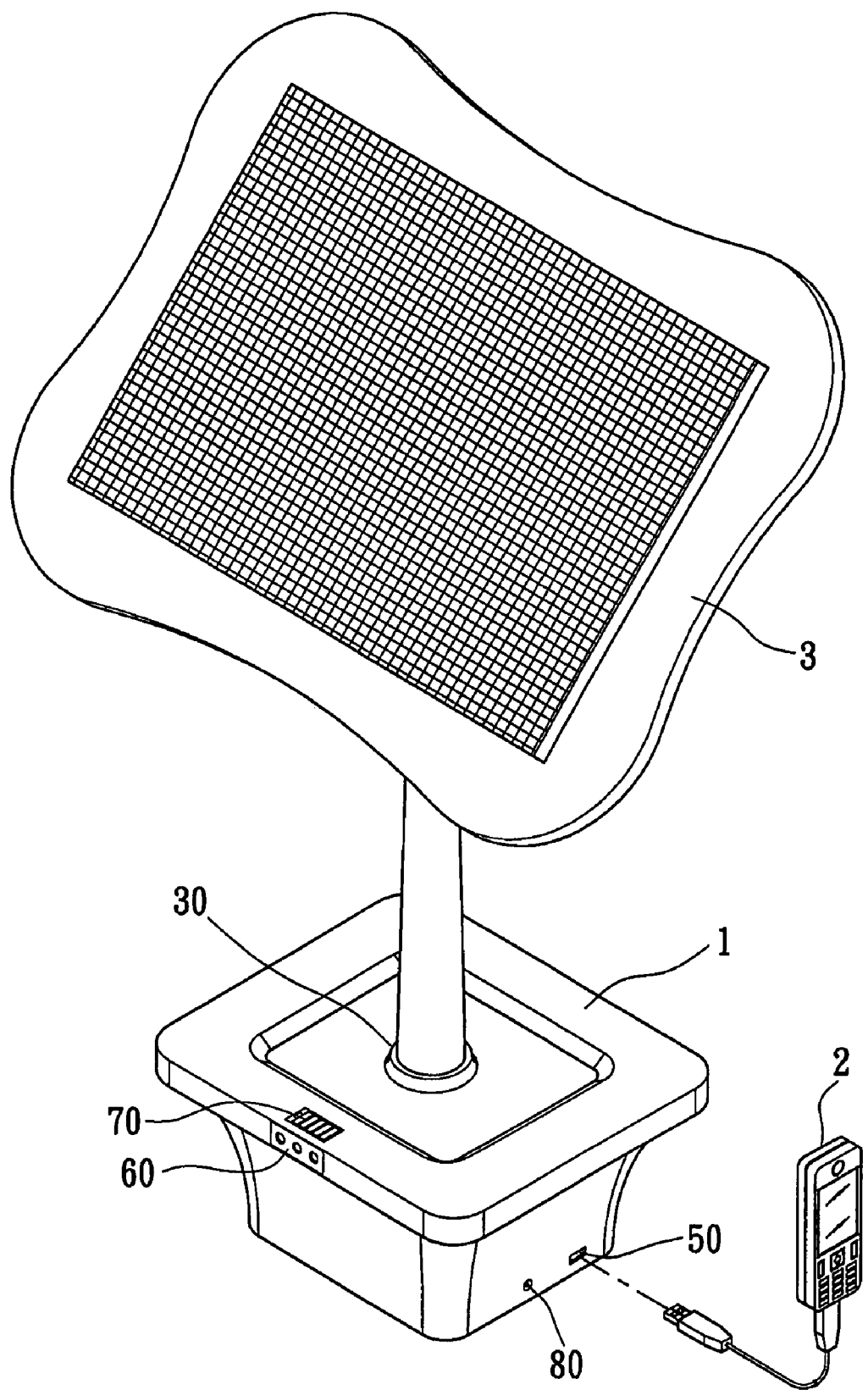
FIG. 3 is a schematic view of a multi-functional power supply device of a first preferred embodiment of the present invention.

Please refer to FIG. 3 which shows a multi-functional power supply device of a first preferred embodiment of the present invention. The first connection unit 30 of the power supply device 1 is connected to the solar board 3 for receiving solar energy and transforming solar energy into electric energy and storing the electric energy. The information displayed in the display unit 70 provides related battery power information to users. Furthermore, users can use a particular application apparatus 2 by connecting the power output unit 50 to the application apparatus. In this preferred embodiment, the power output unit 50 comes with a USB port and the connected application apparatus 2 is a cell phone. Therefore, users can connect the cell phone directly to a USB port for receiving an output voltage 103 controlled and outputted directly by a controller 40 according to the required operating voltage (5 volts) of the cell phone having a USB interface for the cell phone.

If the power supply device 1 is put under sunlight, the power input unit 80 will no longer need to connect to a utility power 104 in order to charge the power supply device 1. Therefore, this preferred embodiment does not need to connect to the power input unit 80.

Figure 4:
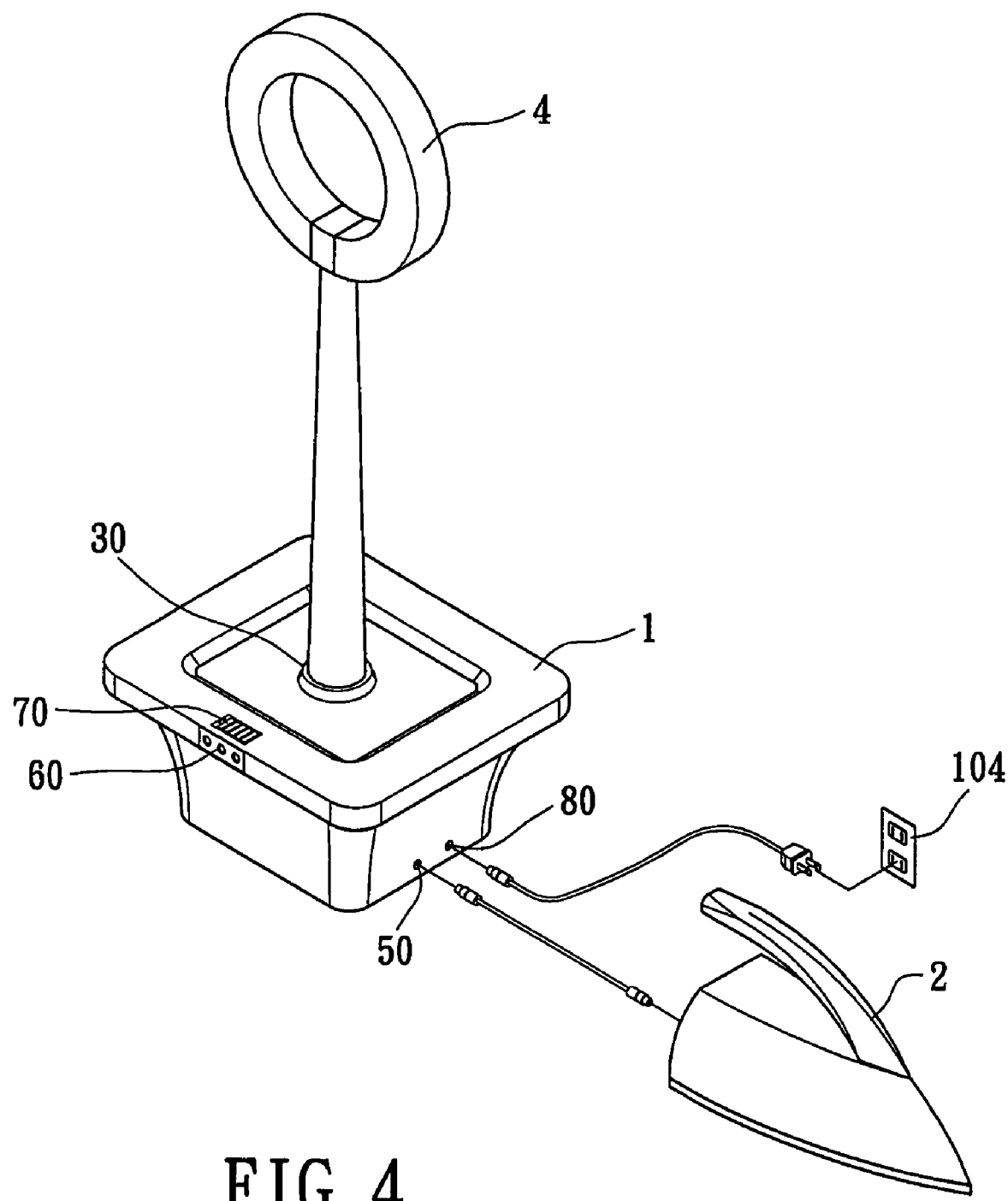
FIG. 4 is a schematic view of a multi-functional power supply device of a second preferred embodiment of the present invention.

Please refer to FIG. 4 which shows a multi-functional power supply device in accordance with a second preferred embodiment of the present invention. The first connection unit 30 of the power supply device 1 is connected to a lighting device 4, and thus the power supply device 1 will not receive solar energy for charging the secondary cell. However, the power device will provide a voltage to the lighting device 4 to produce a light source and achieve illumination. Similarly, users can also connect an application apparatus 2 (such as an electric iron) through the power output unit 50 to receive power supplied by the power supply device 1. In this embodiment, a power supply port of the power output unit 50 is used for illustration, and the operation unit 60 and the display unit 70 are provided for adjusting and displaying information as described above.

When the power of the secondary cell 10 of the power supply device 1 is exhausted, the power input unit 80 receives a utility power 104 to charge the secondary cell 10, while the power supply device 1 continues producing a light source and providing a power source.

Figure 5:
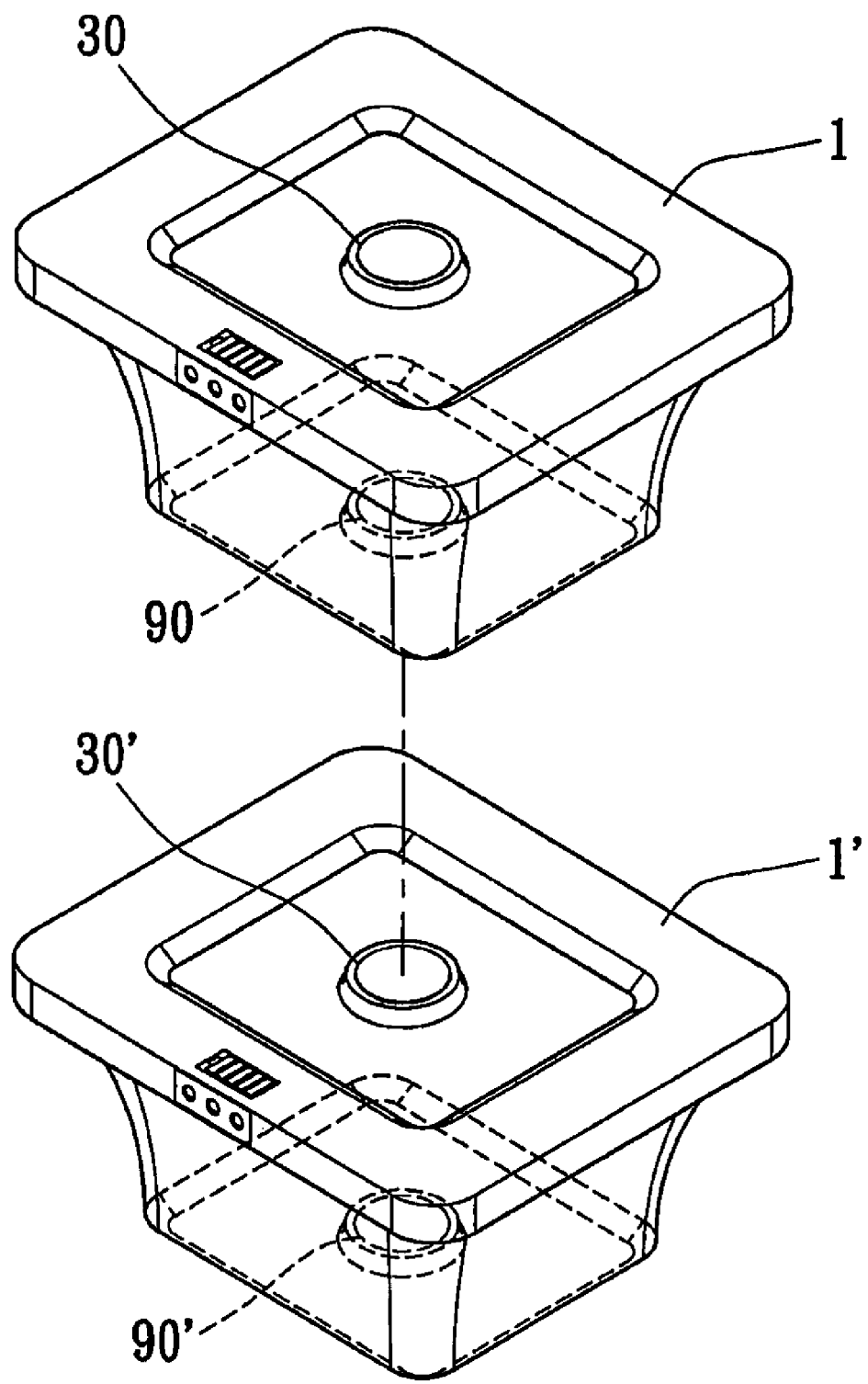
FIG. 5 is a schematic view of a multi-functional power supply device of a third preferred embodiment of the present invention.

Please refer to FIG. 5 which shows a schematic view of a multi-functional power supply device in accordance with a third preferred embodiment of the present invention. A plurality of power supply devices 1, 1' can be connected in series to produce a larger voltage, if needed. The first connection units 30, 30' correspond to the second connection units 90, 90' that can be engaged with each other. In other words, a second connection unit 90 of a power supply device 1 is connected to a first connection unit 30' of another power supply device 1' to electrically connect the secondary cells of two power supply devices 1, 1'.

To sum up the description above, the first connection unit 30 is connected to the solar board 3 or the lighting device 4, and thus the invention not only provides a power source to an externally connected application apparatus 2 anytime, but also uses solar energy to charge the secondary cell under sunlight by connecting the first connection unit 30 to the solar board 3. Further, the first connection unit 30 can be connected to the lighting device 4 to provide a light source in a dark environment. The invention complies with environment protection aims of using solar energy for charging a secondary cell and supplying power, but also maximizes the use of energy sources and achieves different functions.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-functional power supply device, comprising:
   a secondary cell, for storing electric energy, and producing a first voltage and a second voltage;
   a charging circuit, electrically coupled to said secondary cell, for charging said secondary cell;
   a first connection unit, for transmitting electric energy transformed by a solar board to said charging circuit, if said first connection unit is connected to said solar board, and for supplying said first voltage to a lighting device, if said first connection unit is connected to said lighting device;
   a controller, electrically coupled to said secondary cell, for controlling said second voltage to output at least one output voltage to an application apparatus;
   thereby, said first voltage and said second voltage produced by said secondary cell are used for producing energy for the lighting device and the application apparatus respectively;
   a power input unit, electrically coupled to said charging circuit, for receiving a utility power to charge said secondary cell;
   an operation unit, electrically coupled to said controller, for providing an operating interface to modulate said controller to control the magnitude of said output voltage.

2. The multi-functional power supply device of claim 1, wherein said secondary cell is a lead-acid battery.

3. The multi-functional power supply device of claim 1, wherein said solar board further comprises a voltage modulation circuit, for producing an output of a constant voltage by using said electric energy.

4. The multi-functional power supply device of claim 3, wherein said constant voltage is 5 volts.

5. The multi-functional power supply device of claim 1, further comprising a power output unit, electrically coupled to said controller, for connecting said application apparatus to provide said output voltage to said application apparatus.

6. The multi-functional power supply device of claim 5, wherein said power output unit is a power supply port.

7. The multi-functional power supply device of claim 5, wherein said power output unit is a USB port.

8. The multi-functional power supply device of claim 1, wherein said operating interface is a press button or a knob.

9. The multi-functional power supply device of claim 1, further comprising a display unit, electrically coupled to said controller, controlled by said controller to display an electric power level, a charging condition or the magnitude of said output voltage of said secondary cell.

10. The multi-functional power supply device of claim 9, wherein said display unit is a display device or a light emitting diode.

11. The multi-functional power supply device of claim 1, further comprising a second connection unit, corresponding to the design of said first connection unit, and electrically coupled to said secondary cell, for connecting a first connection unit of said other multi-functional power supply device to produce a serial connection or a parallel connection for a plurality of secondary cells.

12. An operating method of a multi-functional power supply device, comprising the steps of:
   providing a first connection unit for connecting a solar board;

providing a secondary cell for storing electric energy transformed and outputted by said solar board, and producing a first voltage and a second voltage by said secondary cell;

determining whether or not said first connection unit is connected to a lighting device;

transmitting said first voltage to said lighting device to generate and supply a light source, if said first connection unit is connected to said lighting device;

providing at least one power output unit for connecting an application apparatus, to produce said second voltage to said application apparatus;

receiving a utility power through a power input unit, for charging said secondary cell when said first connection unit is not connected to said solar board; and controlling said second voltage depending on a voltage required by said application apparatus by modulation and control of an operation unit and a controller.

13. The operating method of a multi-functional power supply device of claim 12, wherein said operation unit is provided for said operating interface of said press button or said knob to make adjustments.

14. The operating method of a multi-functional power supply device of claim 12, wherein said power output unit is a power supply port that complies with the use of different application apparatuses.

15. The operating method of a multi-functional power supply device of claim 12, wherein said power output unit is a USB port that complies with the use of different application apparatuses.

* * * * *